United States Patent [19]

deZarauz

[11] 4,104,265

[45] Aug. 1, 1978

[54] VULCANIZATION PROCESS FOR PREPARATION OF POLYURETHANE TIRES

[75] Inventor: Yves deZarauz, Le Cendre, France

[73] Assignee: Compagnie Generale des Etablissements Michelin, Clermont-Ferrand, France

[21] Appl. No.: 767,371

[22] Filed: Feb. 10, 1977

Related U.S. Application Data

[63] Continuation-in-part of Ser. No. 652,122, Jan. 26, 1976, abandoned.

[30] Foreign Application Priority Data

Jan. 30, 1975 [FR] France ................. 75 03001

[51] Int. Cl.$^2$ .................. C08G 18/62; C08G 18/82
[52] U.S. Cl. .................. 528/46; 260/32 N; 528/75
[58] Field of Search .................. 260/77.5 CR

[56] References Cited

U.S. PATENT DOCUMENTS

| 3,175,997 | 3/1965 | Hsieh | 260/85.1 |
|---|---|---|---|
| 3,427,366 | 2/1969 | Verdol et al. | 260/859 |
| 3,629,172 | 12/1971 | Jones | 260/77.5 CR |
| 3,714,110 | 1/1973 | Verdol et al. | 260/77.5 AP |
| 3,980,606 | 9/1976 | Werner | 260/77.5 AP |

FOREIGN PATENT DOCUMENTS

| 772,222 | 11/1967 | Canada. |
|---|---|---|
| 838,219 | 3/1970 | Canada. |
| 895,387 | 3/1972 | Canada. |
| 1,125,169 | 3/1962 | Fed. Rep. of Germany. |
| 6,709,603 | 1/1968 | Netherlands. |
| 6,801,078 | 7/1968 | Netherlands. |
| 6,904,834 | 9/1969 | Netherlands. |
| 6,910,127 | 1/1971 | Netherlands. |
| 6,910,300 | 1/1971 | Netherlands. |
| 6,700,705 | 9/1969 | Netherlands. |
| 1,162,032 | 8/1969 | United Kingdom. |
| 1,193,301 | 5/1970 | United Kingdom. |
| 1,194,723 | 6/1970 | United Kingdom. |
| 1,205,230 | 9/1970 | United Kingdom. |
| 1,267,401 | 3/1972 | United Kingdom. |
| 1,338,415 | 11/1973 | United Kingdom. |
| 1,350,632 | 4/1974 | United Kingdom. |

OTHER PUBLICATIONS

Hofmann, Vulcanization and Vulcanizing Agents, Palmerton, New York, 1967, pp. 143-159, 316-326.
DOS 2,205,209— Bayer — Jan. 1974.
DOS 2,233,359 — Phoenix — Aug. 1973.

Primary Examiner—H.S. Cockeram
Attorney, Agent, or Firm—Brumbaugh, Graves, Donohue & Raymond

[57] ABSTRACT

Vulcanized elastomers derived from functional liquid diene prepolymers which have properties which make them satisfactory for use as the principal component of mixes serving for the manufacture of pneumatic tires can be prepared by a process which comprises, in general, forming a vulcanizable mix of a functional liquid diene prepolymer having reactive mobile hydrogen functions and having a degree of functionality of between 1.8 and 2.0 and a hydrocarbon chain lengthening bifunctional compound having reactive isocyanate groups in a certain ratio, and conducting chain lengthening and vulcanizing operations in two separate sequential heating stages.

11 Claims, No Drawings

VULCANIZATION PROCESS FOR PREPARATION OF POLYURETHANE TIRES

This application is a continuation-in-part application of U.S. application Ser. No. 652,122, filed Jan. 26, 1976.

The present invention relates to a process of preparing vulcanizates derived from functional liquid polymers, to such vulcanizates and to new or recapped pneumatic tires containing such vulcanizates.

Research has been carried out in order to produce pneumatic tires having a tread and/or sidewalls formed of vulcanizates produced from liquid polymers and/or copolymers of low molecular weight which bear reactive functions such as the hydroxyl function, carboxyl function, etc., commonly designated by the expression "functional liquid polymers." In the Products Data Bulletin Nos. 505, 506, and 508 of the Sinclair Petrochemicals Company, the possibility is mentioned of using vulcanizates having a base of polyurea and poly(ureaurethane) which are prepared by reaction of polyhydroxy diene polymers and/or copolymers, that is to say polymers and/or copolymers which bear more than two reactive functions, with diisocyanates for the manufacture of agricultural and passenger car tires.

However, the properties which can be obtained with these vulcanizates are not sufficient for such use, as has been indicated in particular by the research workers of the Rubber and Plastics Research Association (R.A.P.-R.A.) in particular in Bulletin No. 6, Vol. 25 of November-December, 1971, and in a study entitled "Liquid Rubber For Reinforced Rubber Products, A Technical And Economic Assessment", published by the Rubber and Plastics Research Association of Great Britain in which Messrs. Daniel, Needham and Pyne indicate that "the experiments suggest that the chances of success in obtaining separately a lengthening of the chain and a cross-linking with the existing commercial functional liquid polymers which bear carboxyl or hydroxyl functions at the chain end are slight". These authors furthermore indicate that in order to obtain vulcanizates of sufficient Shore hardness to permit use thereof in pneumatic tires from such commercial liquid polymers, it is necessary to have recourse to very high percentages of fillers and vulcanizing agents which lead to vulcanizates, the mechanical properties of which are insufficient (See Table VII, page 17 of the study) to permit their use in pneumatic tires.

At the conference held by the I.U.P.A.C. (International Union of Pure and Applied Chemistry) in September, 1973, at Aberdeen, Great Britain, one of the speakers of the R.A.P.R.A. mentioned that the reaction of polyfunctional liquid diene polymers with a hydrocarbon chain lengthening polyfunctional compound leads to elastomers which, in vulcanized or unvulcanized state, have a Shore hardness close to that of the conventional, that is to say nonfunctional, diene elastomers, but their mechanical properties taken together are insufficient to permit use thereof in the manufacture of pneumatic tires.

Finally, in French Pat. Nos. 2,187,805; 2,187,806; 2,187,807; 2,187,808; 2,187,809; and 2,187,842 it has been proposed that for the formation of the treads of pneumatic tires use be made of the vulcanizates obtained by reaction of polyfunctional liquid polymers and/or copolymers (that is to say polymers or copolymers bearing more than two functions) with polyisocyanates which are also polyfunctional, the reagents being present in such amount that there is in one and the same stage both chain lengthening and cross-linking or vulcanization. An examination of the examples of said patents setting forth tests carried out with tires having a tread formed of such vulcanizates shows that said vulcanizates present the same drawbacks as those previously mentioned.

The applicant has found a way of obviating the abovementioned drawbacks by discovering surprisingly a process of preparing vulcanized elastomers derived from functional liquid diene prepolymers which have properties which make them satisfactory for use as the principal component of mixes serving for the manufacture of pneumatic tires.

The object of the present invention is a process for the manufacture of vulcanized elastomers which is characterized by contacting one or more functional liquid diene prepolymers having reactive mobile hydrogen functions and having a degree of functionality of between 1.8 and 2.0, either alone or in combination with one or more nonfunctional liquid diene polymers of low molecular weight, and containing, intimately mixed, a reinforcing filler and a vulcanizing or cross-linking system customary for the vulcanization of pneumatic tires, with a hydrocarbon chain lengthening bifunctional compound having reactive isocyanate groups and in such amount that the ratio of the number of reactive isocyanate groups of the hydrocarbon chain lengthening bifunctional compound to the number of reactive mobile hydrogen functions of the functional liquid diene prepolymer or prepolymers in the resultant mix is equal to 1, and bringing said mix, in a first stage, to a temperature of from about 20° C. to about 140° C. to obtain exclusively a chain lengthening or coupling reaction between the functional liquid diene prepolymer and the hydrocarbon chain lengthening bifunctional compound, and, in a second stage, to a higher temperature of from about 145° C. to about 200° C. to effectuate the cross-linking or vulcanization of the chain lengthened or coupled reaction product formed at the end of the first stage.

In order to be able to be used in pneumatic tires as the tread and/or sidewalls, the vulcanizates must in themselves effect a compromise between the properties which are frequently antagonistic to each other. Thus it is conventionally believed that in order to be suitable for use as the principal component of a mix serving for the manufacture of the treads and/or sidewalls of pneumatic tires, a mix having a base of elastomers without oil and filled with 50 parts of carbon black (control mix) must have the following properties:

- a Shore hardness of less than 70; a modulus at 100% elongation measured after the third traction of between 12.0 and 25.0 kg/cm$^2$; a rebound rate at 60° C. equal to or greater than 55 for a butadiene and styrene copolymer containing 25% styrene, equal to or greater than 60 for a butadiene and styrene copolymer containing 12% styrene, equal to or greater than 65 for a cis-1,4-polybutadiene; an elongation at rupture and a rupture force equal to or greater than 370% and 120 kg/cm$^2$, respectively, for a polybutadiene, equal to or greater than 400% and 160 kg/cm$^2$, respectively, for a butadiene and styrene copolymer containing 12% styrene, and equal to or greater than 420% and 180 kg/cm$^2$, respectively, for a butadiene and styrene copolymer containing 25% styrene; an SRT (skid resistance tester) friction coefficient index at 20° C. of greater than 19 for a polybutadiene, 35 for a butadiene-styrene copolymer containing 12% styrene, and 40 for a butadiene-styrene copolymer containing 25% styrene.

In accordance with the invention, as functional liquid diene prepolymers there are used liquid polymers of a molecular weight of less than about 50,000 and preferably between about 1,000 and about 20,000 whose hydrocarbon chain is formed of a homopolymer of conjugated dienes or a copolymer of conjugated dienes either with each other or with vinyl aromatic compounds such as, for instance, polybutadiene, polyisoprene, polypiperylene, polychloroprene, polypentadiene, copolymers of butadiene and styrene, copolymers of butadiene and isoprene, copolymers of styrene and isoprene, copolymers of butadiene or isoprene and vinyl naphthalene, the chains being possibly replaced by alkyl and alkoxy radicals and halogens; copolymers of a conjugated diene and a compound of the class of the vinyl nitriles such as, for instance, a copolymer of butadiene or isoprene and acrylonitrile or methacrylonitrile; and terpolymers of conjugated dienes either with each other or with vinyl aromatic compounds and/or with vinyl nitriles. The monomeric units are incorporated in the chain either at random or in block, the proportions of the monomers being variable.

The liquid diene prepolymers must furthermore be functional, that is to say bear on their hydrocarbon chain, and preferably at the ends thereof, reactive mobile hydrogen functions, i.e., the amine, hydroxyl or thiol groups, and have a degree of functionality of between 1.8 and 2.

The functionality of the prepolymer is determined by a determination of the functions borne thereon, by a determination of the molecular weight of the prepolymer and by a coupling reaction with the use of a bifunctional reagent suitable for the function borne by the prepolymer, that is to say either a poly-addition or a poly-condensation reagent. The coupling reaction leads to a gelated product which is practically insoluble if the number of functions borne per hydrocarbon chain is greater than 2 or, if the functionality is equal to or less than 2, to a soluble product the molecular weight of which can be determined by conventional techniques. One can easily determine the functionality by the known formula appearing on page 438 of Burnett's manual entitled "Mechanism of Polymer Reactions" published by Interscience Publishers.

These functional liquid diene prepolymers may be used alone or in combination with one or more nonfunctional liquid diene homopolymers or copolymers of low molecular weight such as polybutadiene, polyisoprene, a copolymer of butadiene and styrene, etc.

By "hydrocarbon chain lengthening bifunctional compound having reactive isocyanate groups" there are understood organic compounds which bear reactive isocyanate groups capable of reacting with the reactive mobile hydrogen functions of the functional liquid diene prepolymer to lead to poly-addition or poly-condensation products. Suitable such compounds include, for instance, tolylene diisocyanate, 4,4'-diphenylmethane diisocyanate, trimethyl hexamethylene diisocyanate and hexamethylene diisocyanate.

The reinforcing fillers used are formed of products commonly employed in the manufacture of pneumatic tires such as carbon black, silica, metallic reinforcing elements, glass, etc., plasticizers and/or extending oils. These fillers must be dispersed very uniformly with the functional liquid diene prepolymer upon the carrying out of the process.

By "vulcanizing or cross-linking system" there is understood a system comprising sulfur, zinc oxide, and an accelerator having no mobile hydrogen. As vulcanization accelerators there are used either compounds which are inactive with respect to the hydrocarbon chain lengthening bifunctional compound or compounds which are normally reactive with the hydrocarbon chain lengthening bifunctional compound at the polyaddition or polycondensation temperature but had been made inactive with respect to it by suitable means, for instance, by encapsulation. All conventional agents can therefore be used, such as the primary and secondary amines; the sulfenamides of mercaptobenzothiazole and in particular N-diisopropyl mercaptobenzothiazole sulfenamide, N-dicyclohexyl-mercaptobenzothiazyl sulfenamide; the sulfenamides of thiocarbonic acid such as the N-morpholinosulfenamide of N-morpholinothiocarbonic acid; the phosphorous compounds such as bis-(diisopropylthiophosphoryl) disulfide, bis-(diethylthiophosphoryl) trisulfide, and zinc dibutyldithiophosphate; the guanidines; the mercapto-triazines such as, for instance, bis-(2-N-ethylamine, 6-N-diethylamine, 1,3,5 triazine)4,4'-disulfide. Suitable polyaddition catalysts can also be added during the carrying out of the process.

The mix may further comprise, when desired, an antioxidant which is inactive with respect to the hydrocarbon chain lengthening bifunctional compound.

The invention will be clearly understood from the following nonlimitative examples which are given by way of illustration.

EXAMPLE 1

In this background example two tests were carried out, A-1 and B-1, in order to compare the properties of the reaction product of a commercial hydroxylated polybutadiene and a diisocyanate with the properties of a nonfunctional polybutadiene (Test A-1) as well as the properties of the reaction product of a hydroxylated copolymer of butadiene and styrene (the latter being present in an amount of 25% by weight) and a diisocyanate with the properties of a non-functional copolymer of butadiene and styrene (the latter being present in an amount of 22%) (Test B-1). In both tests, the ratio of the number of reactive NCO groups of the hydrocarbon chain lengthener to the number of reactive OH groups of the prepolymer was equal to 1 when the mix was completed.

The operating conditions and the results are set forth in Table I below:

TABLE 1

| Conditions and Properties | Test A-1 | | Test B-1 | |
|---|---|---|---|---|
| | | Control: | | Control: |
| Elastomers (100 parts by weight) | Hydroxylated polybutadiene R-15 M f = 2.2 to 2.4 | Solprene 200 | SBR CS 15 f = 2.5 to 2.8 | SBR 1500 |
| Vulcanization system (parts by weight) | none | S/Santocure 1/1.6 | none | S/Santocure 1.6/1 |
| Stearic acid | — | 1.5 | — | 2 |
| HAF black | 55 | 50 | 55 | 50 |

TABLE 1-continued

| Conditions and Properties | Test A-1 | Control: | Test B-1 | Control: |
|---|---|---|---|---|
| 4010 NA | — | 1 | — | — |
| Tolylene diisocyanate | 7.7 | — | 8.1 | — |
| ZnO | — | 4 | — | 3 |
| Sundex 8125 | — | 8 | — | 5 |
| Time of vulcanization | 40 min. at 140° C. | 40 min. at 140° C. | 60 min. at 140° C. | 60 min. at 140° C. |
| Modulus at 100% elongation (kg/cm$^2$) | 31.4 | 19.2 | 34.6 | 19.0 |
| Rebound rate at 60° C. | 58 | 77.9 | 54 | 67 |
| Scott fracture index: | | | | |
| Elongation at rupture (%) | 297 | 420 | 404 | 520 |
| Rupture force (kg/cm$^2$) | 144 | 139 | 190 | 270 |
| Shore hardness | 72 | 69 | 75 | 68 |

S is sulfur;

R-15-M is a liquid hydroxylated polybutadiene marketed by Arco;

$f$ is the degree of functionality of the prepolymer;

Solprene 200 is a polybutadiene marketed by Phillips;

Santocure is a registered trademark for N-cyclohexyl-2-benzothiazole sulfenamide marketed by Monsanto;

SBR CS 15 is a liquid hydroxylated butadiene-styrene copolymer containing 25% by weight styrene, marketed by Arco;

SBR 1500 is a butadiene-styrene copolymer containing 25% by weight styrene, marketed by Shell;

Sundex 8125 is a 70% aromatic oil of a molecular weight of 380, density of 0.996, marketed by Sun Oil; and 4010 NA is N-isopropyl, N'-phenyl-para-phenylene diamine.

There is immediately noted the uselessness of vulcanizing the resultant elastomers of R-15-M or SBR CS 15 by sulfur, because, on the one hand, the moduli and the Shore hardness are already too high to permit the use thereof in pneumatic tires, while the elongation at rupture, on the other hand, is much too low to permit such an application. Therefore the properties of the polymers obtained from prepolymers of a functionality of more than 2, even when the NCO/OH ratio is equal to 1, are insufficient to permit the use thereof in the manufacture of pneumatic tires.

EXAMPLE 2

In this further background example a Test A-2 was carried out which consisted in reacting a hydroxylated butadiene-styrene precopolymer (the styrene being present in an amount of 25% by weight) having a functionality $f$ of 1.97 and a molecular weight of 6,000 with methylene diphenyl diisocyanate. The ratio of the number of NCO reactive groups of the hydrocarbon chain lengthener to the number of OH reactive groups of the precopolymer was equal to 1 when the mix was completed. The polyaddition reagent or chain lengthener and vulcanization agents were introduced at the same time. The mixing having been completed, heating was performed for 1 hour at 140° C. in order to effectuate the polyaddition or chain lengthening and vulcanization reactions in a single step. The test was carried out with the following formulation: precopolymer, 100 parts; HAF black, 50 parts; dicylcohexylamine benzothiazylsulfenamide, 1.7 parts; sulfur, 1.5 parts; ZnO, 4 parts; and iron acetylacetonate, $9 \times 10^{-3}$ g. per 100 g. of precopolymer.

The properties are set forth in Table II below and compared with those of the control nonfunctional diene copolymer (SBR 1500).

TABLE II

| Properties | Test A-2 | Control: SBR 1500 |
|---|---|---|
| Modulus at 100% elongation (kg/cm$^2$) | 20.1 | 19.0 |
| Rebound rate at 60° C. | 50.3 | 67 |
| Scott fracture index: | | |
| - elongation at rupture (%) | 503 | 590 |
| - rupture force (kg/cm$^2$) | 135 | 270 |
| Shore hardness | 68 | 68 |

It was found that it was not possible to obtain a copolymer having the same properties as those of the control compound and it is noted in particular in Test A-2 that the rupture force and the rebound rate are too low. This is due to the fact that the chain lengthening and vulcanization stages cannot be controlled.

EXAMPLE 3

The procedure of Example 2 was repeated, using similar conditions except that the mix was heated for 20 minutes at 110° C. and then for 20 minutes at 160° C. in order to separate the chain lengthening and vulcanization stages. The properties of the two elastomers are set forth in Table III below.

TABLE III

| Properties | Test A-3 | Control: SBR 1500 |
|---|---|---|
| Modulus at 100% elongation (kg/cm$^2$) | 20.9 | 19.0 |
| Rebound rate at 60° C. | 60.7 | 67 |
| Scott fracture index: | | |
| - elongation at rupture (%) | 540 | 580 |
| - rupture force (kg/cm$^2$) | 256 | 270 |
| Shore hardness | 68 | 68 |

Comparing the properties of copolymer A-3 of the invention with those of copolymer A-2 of background Example 2 it is noted that the copolymer A-3 has a definitely improved resistance to rupture (an increase of more than 100 kg/cm$^2$) and a rebound rate at 60° C. which is about 20% higher. Furthermore, it is noted that the copolymer A-3 has properties substantially equal to those of a conventional copolymer.

Road tests were carried out with tires having a tread containing as the principal component, in some cases, the copolymer A-3 in accordance with the invention and, in other cases, the control conventional copolymer in order to compare the coefficients of friction and wear, that is to say the rate of loss of weight by wear.

The coefficient of wear is expressed by the ratio:

$$\frac{\text{loss of weight of the "test" tire}}{\text{loss of weight of the control tire}} \times 100$$

The coefficient of friction is measured at 20° C. with the "skid resistance tester" (SRT) marketed by the Stanley Company.

The losses in weight are determined after driving a vehicle over a given path and the index of 100 is assigned to the control tire.

The results obtained are set forth in Table III-A below:

TABLE III-A

| Properties | Copolymer A-3 | Control: SBR 1500 |
|---|---|---|
| Friction coefficient index | 65 | 45 |
| Loss of weight by wear (%) | 125 | 100 |

It is noted that although the friction coefficient index of the tire having a tread formed of the copolymer A-3 is about 40% greater than that of the control tire, the wear-adherence compromise is definitely better than that of the control tire.

EXAMPLES 4 – 9

In this series of six replicate examples, copolymers were produced using as the precopolymer 100 parts of a hydroxylated butadiene-styrene copolymer (the styrene being present in an amount of 12% by weight) of a functionality of 1.97 and a molecular weight of 6,000. The tests were carried out with the following formulation: HAF black, 50 parts; methylene diphenyl diisocyanate in an amount such that NCO/OH = 1.0 in the mix produced; sulfur, 1.5 parts; dicyclohexylamine benzothiazyl sulfenamide, 1,7 parts; ZnO, 4 parts; and iron acetylacetonate, $9 \times 10^{-3}$ g. per 100 g. of precopolymer. After homogenizing, heating was performed for 20 minutes at 110° C. and then for 20 minutes at 160° C. The results obtained are set forth in Table IV below and the properties of the products obtained are compared with those of a control butadiene-styrene copolymer known as Stereon 700 in which the styrene is present in an amount of 12% by weight.

TABLE IV

| Properties | Example No. | | | | | | Control Stereon 700 |
|---|---|---|---|---|---|---|---|
| | 4 | 5 | 6 | 7 | 8 | 9 | |
| Modulus at 100% elongation (kg/cm$^2$) | 17.4 | 17.2 | 17.0 | 16.7 | 17.2 | 17.3 | 21.7 |
| Rebound rate at 60° C. | 62.6 | 62.6 | 62.8 | 62.1 | 62.2 | 61.8 | 70 |
| Scott fracture index: | | | | | | | |
| - elongation at rupture (%) | 600 | 620 | 633 | 613 | 603 | 600 | 480 |
| - rupture force (kg/cm$^2$) | 257 | 257 | 268 | 257 | 260 | 242 | 180 |
| ISO hardness | 58 | 60 | 59 | 59 | 59 | 59 | 66 |

It is noted that the properties of the six replicate chain extended copolymers of the invention are substantially identical and therefore that the process in accordance with the invention possesses good reproducibility.

Road tests were carried out with tires having a tread containing as the principal component, in some cases, the copolymer of Example 4 and, in other cases, the control copolymer SBR 1500 in order to compare the friction coefficient index and the rate of loss of weight by wear. The results are set forth in Table IV-A below:

TABLE IV-A

| Properties | SBR obtained in Example 4 | Control: SBR 1500 |
|---|---|---|
| Friction coefficient index | 45 | 45 |
| Loss of weight by wear (%) | 80 | 100 |

It will be noted that the tire having a tread comprising an elastomer prepared in accordance with the invention as the principal component had a better wear-adherence compromise than that of the control tire.

EXAMPLE 10

An elastomer extended with oil is produced by using, as the precopolymer, a hydroxylated butadiene-styrene copolymer containing 12% by weight styrene of a functionality of 1.97 and a molecular weight of 6,000 and methylene diphenyl diisocyanate as the hydrocarbon chain lengthener in such amount as to have a ratio of NCO/OH of 1.0 in the finished mix. The test was carried out with the following formulation: precopolymer, 100 parts; naphthenic oil of a molecular weight of 390, of density 0.946 (Circosol 2 × H sold by Sun Oil), 30 parts; ISAF black, 65 parts; ZnO, 5 parts; iron acetylacetonate, $45 \times 10^{-3}$ g. per 100 g. of precopolymer; sulfur, 1.17 parts; bis(diisopropylthiophosphoryl)disulfide, 1.56 parts; and mercaptobenzothiazole disulfide, 0.482 part. Heating was performed for 20 minutes at 110° C. and then for 22 minutes at 155° C. The properties of the product obtained are compared with those of a control butadiene-styrene copolymer filled with aromatic oil in an amount of 37.5 parts and known as "Solprene 384", marketed by Phillips Petroleum, vulcanized for 60 minutes at 140° C. with the following formulation: Solprene 384, 100 parts; ISAF black, 50 parts; stearic acid, 2 parts; ZnO, 1 parts; 4010 NA, 1 part; Santocure, 1 part; and sulfur, 1.8 parts.

The properties of the vulcanizates obtained are set forth in Table V below:

TABLE V

| Properties | SBR in accordance with the invention | Control: Solprene 384 |
|---|---|---|
| Modulus at 100% elongation (kg/cm$^2$) | 19.5 | 18.8 |
| Rebound rate at 60° C. | 80 | 70 |
| Scott fracture index: | | |
| - elongation at rupture (%) | 377 | 420 |
| - rupture force (kg/cm$^2$) | 210 | 200 |
| ISO hardness | 63.5 | 65 |

It is noted that the properties of the vulcanizate extended with oil in accordance with the invention remain superior to those of a conventional elastomer extended with oil.

EXAMPLE 11

The procedure of Examples 4-9 was repeated using the same precopolymer with the following formulation: ISAF black, 50 parts; 4, 4'-diphenylmethane diisocyanate in an amount such that NCO/OH = 1.0 in the mix produced; sulfur, 0.4 part; mercaptobenzothiazole disulfide, 0.25 part; ZnO, 4 parts; iron acetylacetonate, $9 \times 10^{-3}$ g. per 100 g. of precopolymer; and bis(diisopropylthiophosphoryl) disulfide, 0.8 part.

The results obtained are set forth in Table VI below:

TABLE VI

| Properties | SBR in accordance with the invention |
|---|---|
| Modulus at 100% elongation (kg/cm$^2$) | 20.5 |
| Rebound rate at 60° C. | 69.8 |
| Scott fracture index: | |
| - elongation at rupture (%) | 550 |
| - rupture force (kg/cm$^2$) | 287 |

EXAMPLE 12

100 parts of a hydroxylated butadiene-styrene copolymer (the styrene being present in an amount of 12% by weight) of a functionality of 1.97 and a molecular weight of 6,000 were used. The test was carried out with the following formulation: ISAF black, 50 parts; trimethyl hexamethylene diisocyanate in an amount such that NCO/OH = 1.0 in the mix produced; sulfur, 0.4 part; mercaptobenzothiazole disulfide, 0.25 part; ZnO, 4 parts; bis(diisopropylthiophosphoryl) disulfide, 0.8 part; and stannous dibutyldilaurate, 0.20 part. After homogenizing, heating was preformed for 45 minutes at 110° C. and then for 20 minutes at 160° C. The results obtained are set forth in Table VII below.

TABLE VII

| Properties | SBR in accordance with the invention |
|---|---|
| Modulus at 100% elongation (kg/cm$^2$) | 18.5 |
| Rebound rate at 60° C. | 61.2 |
| Scott fracture index: | |
| - elongation at rupture (%) | 593 |
| - rupture force (kg/cm$^2$) | 244 |

EXAMPLE 13

In this example, two tests were carried out in order to compare the viscosity of the reaction product of a hydroxylated precopolymer and a diisocyanate with the viscosity of the reaction product of a mercapto precopolymer and a diisocyanate. The tests show that the products would have, when vulcanized, the properties which render them able to be used in pneumatic tires.

A-4 Control Test:

A hydroxylated butadiene-styrene copolymer (the styrene being present in an amount of 12% by weight) having a molecular weight of 4,800, an initial inherent viscosity of 0.20 (the viscosity was measured at 20° C. in a 0.1% solution of toluene) and a functionality of 1.98 was mixed with 4, 4'-diphenylmethane diisocyanate in such a quantity that the ratio of the number of NCO reactive groups of the hydrocarbon chain lengthener to the number of OH reactive groups of the copolymers was equal to 1 when the mix was completed. The mixing having been completed, heated was performed for 1 hour at 110° C. and 24 hours at 90° C. The reaction product has an inherent viscosity of 4.06 and was free of gel. A-5

A mercapto polybutadiene having a molecular weight of 11,000, an initial inherent viscosity of 0.40 and a functionality of 1.97 was mixed with 4, 4'-diphenylmethane diisocyanate in such a quantity that the ratio of the number of NCO reactive groups of the hydrocarbon chain lengthener to the number of SH reactive groups of the polymer was equal to 1 when the mix was completed. The mixing having been completed, heating was performed for 24 hours at 60° C. The reaction product had an inherent viscosity of 3.03 and was free of gel.

These tests show that the reaction products have a high viscosity which enables then to be used, after they are vulcanized, in pneumatic tires.

EXAMPLES 14-17

In this series of four replicate examples, copolymers were produced using as the precopolymer 100 parts of a hydroxylated butadiene-styrene copolymer (the styrene being present in an amount of 12% by weight) of a functionality of 1.97 and a molecular weight of 6,000 and 4, 4'-diphenylmethane diisocyanate in an amount such that the ratio of the number of reactive NCO groups of the hydrocarbon chain lengthener to the number of reactive OH groups of the precopolymer was equal to 1 when the mix with the formulation was completed.

The operating conditions and the results are set forth in Table VIII below:

TABLE VIII

| Conditions and Properties | Test A-6 | Test A-7 | Test A-8 | Test A-9 |
|---|---|---|---|---|
| ISAF black | 50 | 50 | 50 | 50 |
| ZnO | 4 | 4 | 4 | 4 |
| Iron acetylacetonate (g. per 100 g. of precopolymer) | 9 × 10$^{-3}$ | 9 × 10$^{-3}$ | 9 × 10$^{-3}$ | 9 × 10$^{-3}$ |
| Sulfur | 1.71 | 1 | 0.4 | 1.7 |
| Dicyclohexyl mercaptobenzothiazole sulfenamide | 1.5 | — | — | — |
| N-morpholinosulfenamide of N-morpholinothiocarbonic acid | — | 1 | — | — |
| Mercaptobenzothiazole disulfide | — | — | 0.25 | — |
| Bis(diisopropylthiophosphoryl) disulfide | — | — | 0.8 | — |
| Diisopropylmercapto benzothiazole sulfenamide | — | — | — | 1.5 |
| Time of vulcanization | 20 min. at 110° C. 20 min. at 160° C. | 17 min. at 110° C. 35 min. at 150° C. | 20 min. at 110° C. 40 min. at 150° C. | 35 min. at 110° C. 20 min. at 160° C. |
| Modulus at 100% elongation (kg/cm$^2$) | 23.0 | 21.8 | 24.2 | 19.6 |
| Rebound rate at 60° C. | 64.7 | 63.7 | 68.6 | 59.8 |
| Scott fracture index: | | | | |
| - elongation at rupture (%) | 510 | 485 | 537 | 370 |
| - rupture force (kg/cm$^2$) | 264 | 235 | 277 | 185 |

EXAMPLES 18-20

In this series of three replicate examples, polymers and copolymers were produced by using hydroxylated prepolymers having all the same molecular weight of 6,000 and the same functionality of 1.98. The hydrocarbon chain lengthener used was trimethylhexamethylene diisocyanate in a quantity such that the ratio of the number of reactive NCO groups to the number of reactive OH groups of the prepolymers was equal to 1 when the mix with the formulation was completed.

The operating conditions and the results are set forth in Table IX below:

when the mix was completed. The test was carried out with the following formulation: ISAF black, 60 parts; ZnO, 4 parts; iron acetylacetonate, $18 \times 10^{-3}$ g. per 100 g. of precopolymer; sulfur, 1.9 parts; dicyclohexyl mer-

TABLE IX

| Conditions and Properties | Test A-10 | Test A-11 | Test A-12 |
|---|---|---|---|
| Elastomers (100 parts by weight) | Polybutadiene | SBR (styrene 12% by weight) | SBR (styrene 25% by weight) |
| ISAF black | 50 | 50 | 50 |
| ZnO | 4 | 4 | 4 |
| Iron acetylacetonate (g. per 100 g. of prepolymer) | $6 \times 10^{-3}$ | $9 \times 10^{-3}$ | $9 \times 10^{-3}$ |
| Sulfur | 1.6 | 1.6 | 1.6 |
| Dicyclohexyl mercaptobenzothiazole sulfenamide | 1.4 | 1.4 | 1.4 |
| Time of vulcanization | 30 min. at 110° C. 22 min. at 160° C. | 25 min. at 110° C. 22 min. at 160° C. | 25 min. at 110° C. 22 min. at 160° C. |
| Modulus at 100% elongation (kg/cm$^2$) | 18.0 | 20.0 | 21.0 |
| Rebound rate at 60° C. | 60 | 66 | 60 |
| Scott fracture index: | | | |
| - elongation at rupture (%) | 510 | 500 | 500 |
| - rupture force (kg/cm$^2$) | 210 | 220 | 270 |

EXAMPLES 21-26

In this series of six replicate samples, copolymers were produced by using as the precopolymer 100 parts of a hydroxylated butadiene-styrene copolymer (the styrene being present in an amount of 12% by weight) of a functionality of 1.97 and trimethyl hexamethylene diisocyanate as the hydrocarbon chain lengthener used in such quantities that the ratio of the number of reactive NCO groups to the number of reactive OH groups of the precopolymers was equal to 1 when the mix with the formulation was completed.

The operating conditions and the results are set forth in Table X below:

captobenzothiazole sulfenamide, 1.6 parts. Heating was performed for 20 minutes at 110° C. and then for 25 minutes at 160° C.

The properties of the vulcanizate are set forth in Table XI below.

TABLE XI

| Properties | SBR in accordance with the invention |
|---|---|
| Modulus at 100% elongation (kg/cm$^2$) | 17.9 |
| Rebound rate at 60° C. | 63.7 |
| Scott fracture index: | |
| - elongation at rupture (%) | 560 |
| - rupture force (kg/cm$^2$) | 220 |
| ISO hardness | 59 |

TABLE X

| Conditions and Properties | Test A-3 | Test A-14 | Test A-15 | Test A-16 | Test A-17 | Test A-18 |
|---|---|---|---|---|---|---|
| Elastomers (100 parts by weight) | SBR M.W. = 6,000 | SBR M.W. = 6,000 | SBR M.W. = 6,000 | SBR M.W. = 10,000 | SBR M.W. = 10,000 | SBR M.W. = 10,000 |
| ISAF black | 50 | 50 | 70 | 50 | 60 | 65 |
| ZnO | 4 | 4 | 4 | 4 | 4 | 4 |
| Iron acetylacetonate (g. per 100 g. of pre-copolymer) | $9 \times 10^{-3}$ | $9 \times 10^{-3}$ | $18 \times 10^{-3}$ | $9 \times 10^{-3}$ | $13 \times 10^{-3}$ | $16 \times 10^{-3}$ |
| Naphthenic oil of a molecular weight of 390, of density 0.946 (Circosol 2 × H sold by Sun Oil) | — | 8 | 22 | — | 16 | 30 |
| Sulfur | 1.6 | 1.6 | 0.75 | 1.6 | 2.3 | 3.3 |
| Dicyclohexyl mercaptobenzothiazole sulfenamide | 1.4 | 1.4 | — | 1.4 | 1.78 | 2.9 |
| Bis(diisopropylthiophosphoryl) disulfide | — | — | 1 | — | — | — |
| Mercaptobenzothiazole disulfide | — | — | 0.32 | — | — | — |
| Time of vulcanization | ← 25 min. at 110° C. and 22 min. at 160° C. → | | | | | |
| Modulus at 100% elongation (kg/cm$^2$) | 24.3 | 19.1 | 19.6 | 22.6 | 17.1 | 24.2 |
| Rebound rate at 60° C. | 66.4 | 64.9 | 69.6 | 60.1 | 71.3 | 72.1 |
| Scott fracture index: | | | | | | |
| - elongation at rupture (%) | 470 | 533 | 443 | 473 | 530 | 380 |
| - rupture force (kg/cm$^2$) | 266 | 240 | 239 | 211 | 220 | 205 |

EXAMPLE 27

An elastomer was produced by reacting 100 parts of a hydroxylated butadiene-styrene copolymer (the styrene being present in an amount of 12% by weight) of a functionality of 1.98 and a molecular weight of 5400, 20 parts of a nonfunctional polybutadiene of a molecular weight of 2000 with hexamethylene diisocyanate as the hydrocarbon chain lengthener in such a quantity that the ratio of the number of reactive NCO groups of the hydrocarbon chain lengthener to the number of reactive OH groups of the precopolymer was equal to 1

EXAMPLE 28

An elastomer was produced by reacting 100 parts of a methylamino butadiene-styrene copolymer (the styrene being present in an amount of 12% by weight) of a functionality of 1.97 and a molecular weight of 6600 with methylene diphenyl diisocyanate as the hydrocarbon chain lengthener in such a quantity that the ratio of the number of reactive NCO groups of the hydrocarbon chain lengthener to the number of reactive NHCH$_3$ groups of the precopolymer was equal to 1 when the mix was completed. The test was carried out with the following formulation: ISAF black, 50 parts; dicyclohexyl mercaptobenzothiazole sulfenamide, 1.4 parts; sulfur, 1.6 parts; ZnO, 4 parts; iron acetylacetonate, 2 × $10^{-3}$ g. per 100 g. of precopolymer. Heating was performed for 10 minutes at 110° C. and then for 22 minutes at 160° C.

The properties of the vulcanizate obtained are set forth in Table XII below.

TABLE XII

| Properties | SBR in accordance with the invention |
|---|---|
| Modulus at 100% elongation (kg/cm$^2$) | 24.6 |
| Rebound rate at 60° C. | 61 |
| Scott fracture index: | |
| - elongation at rupture (%) | 470 |
| - rupture force (kg/cm$^2$) | 230 |
| ISO hardness | 69 |

I claim:
1. A process for the manufacture of a vulcanized elastomer which comprises
   (1) forming a mix comprising
      (a) at least one functional liquid diene prepolymer having reactive mobile hydrogen functions and a degree of functionality of between 1.8 and 2.0;
      (b) a reinforcing filler; and
      (c) a vulcanizing system comprising sulfur, zinc oxide, and an accelerator having no mobile hydrogen; and adding to the mix
      (d) a hydrocarbon chain lengthening bifunctional compound having reactive isocyanate groups and in such amount that the ratio of the number of reactive isocyanate groups of the hydrocarbon chain lengthening bifunctional compound to the number of reactive mobile hydrogen functions of the functional liquid diene prepolymer in the resultant mix is equal to one;
   (2) in a first stage, heating the resultant mix to a temperature of from 20° C. to about 140° C. to obtain exclusively a chain lengthening reaction between the functional liquid diene prepolymer and the hydrocarbon chain lengthening bifunctional compound; and
   (3) in a second stage, further heating the resultant mix to a higher temperature of from about 145° C. to about 200° C. to effectuate the vulcanization of the chain lengthened reaction product formed at the end of the first stage.

2. The process as defined by claim 1, wherein sid mix further contains at least one nonfunctional liquid diene polymer of low molecular weight.

3. The process as defined by claim 1, wherein the functional liquid diene prepolymer has a molecular weight of between about 1,000 and about 20,000.

4. The process as defined by claim 1, wherein the reactive mobile hydrogen functions of the functional liquid diene prepolymer are amine, hydroxyl or thiol functions.

5. The process as defined by claim 4, wherein the functional liquid diene prepolymer is a hydroxylated butadiene-styrene copolymer.

6. The process as defined by claim 4, wherein the functional liquid diene prepolymer is a hydroxylated polybutadiene.

7. The process as defined by claim 4, wherein the functional liquid diene prepolymer is a mercapto polybutadiene.

8. The process as defined by claim 1, wherein the hydrocarbon chain lengthening bifunctional compound having reactive isocyanate groups is tolylene diisocyanate, 4, 4'-diphenylmethane diisocyanate, trimethyl hexamethylene diisocyanate or hexamethylene diisocyanate.

9. A vulcanized elastomer prepared by the process defined by claim 1.

10. A pneumatic tire having its tread formed principally of a vulcanized elastomer prepared by the process defined by claim 1.

11. A pneumatic tire having its sidewalls formed principally of a vulcanized elastomer prepared by the process defined by claim 1.

* * * * *

UNITED STATES PATENT OFFICE
CERTIFICATE OF CORRECTION

Patent No. 4,104,265  Dated August 1, 1978

Inventor(s) Yves deZarauz

It is certified that error appears in the above-identified patent and that said Letters Patent are hereby corrected as shown below:

First page, col. 2, line 5, "9/1969" should read -- 9/1967 --. Col. 8, line 27, "1 parts" should read -- 1 part --. Col. 9, line 22, "preformed" should read -- performed --. Col. 10, line 9, "has" should read -- had --; line 10, "A-5" should appear, as a heading, on the following line; line 22, "then" should read -- them --. Col. 11, line 23, "samples" should read -- examples --; headings of Table X, "Test A-3" should read -- Test A-13 --. Col. 14, line 8, "sid" should read -- said --.

Signed and Sealed this

Fifteenth Day of May 1979

[SEAL]

Attest:

RUTH C. MASON
Attesting Officer

DONALD W. BANNER
Commissioner of Patents and Trademarks